(12) United States Patent
Green et al.

(10) Patent No.: US 10,479,384 B2
(45) Date of Patent: Nov. 19, 2019

(54) APPAREL CART

(71) Applicant: Walmart Apollo, LLC, Bentonville, AR (US)

(72) Inventors: Jeffrey Green, Bentonville, AR (US); Nathan Michael Hicks, Rogers, AR (US); Ryan DeJarnette, Fayetteville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/055,280

(22) Filed: Aug. 6, 2018

(65) Prior Publication Data

US 2019/0084601 A1 Mar. 21, 2019

Related U.S. Application Data

(60) Provisional application No. 62/561,506, filed on Sep. 21, 2017.

(51) Int. Cl.
*B62B 3/02* (2006.01)
*B62B 3/00* (2006.01)
(Continued)

(52) U.S. Cl.
CPC ............ *B62B 3/005* (2013.01); *B62B 3/006* (2013.01); *B62B 3/02* (2013.01); *B62B 5/06* (2013.01);
(Continued)

(58) Field of Classification Search
CPC .................................... B62B 3/005; B62B 3/006; B62B 3/02; B62B 3/06; B62B 3/002; B62B 3/004;
(Continued)

(56) References Cited

U.S. PATENT DOCUMENTS 3,168,329 A * 2/1965 Goldschmidt ............ B62B 3/10
 280/651
5,702,115 A * 12/1997 Pool ..................... A61G 12/001
 280/47.35
(Continued)

FOREIGN PATENT DOCUMENTS

WO 2009151944 A1 12/2009

OTHER PUBLICATIONS

International Search Report and Written Opinion in PCT/US2018/045315 dated Oct. 16, 2018; 10 pages.

(Continued)

*Primary Examiner* — John D Walters
(74) *Attorney, Agent, or Firm* — Schmeiser, Olsen & Watts LLP; Timothy P. Collins

(57) ABSTRACT

An apparel cart comprises a base portion that includes a table; a slideable shelf; and a pull-out drawer, each constructed and arranged for positioning under the table and extendable from either a first side or second side of the table; a hanger rod assembly extending from a first end of the table, wherein at least one of the table, the slideable shelf, the pull-out drawer, or the hanger rod assembly is constructed and arranged for a user to perform an operation on at least one apparel item; and a set of wheels coupled to a bottom region of the base portion for moving the apparel cart between a location where the operation is performed on the at least one apparel item to another location.

11 Claims, 10 Drawing Sheets

(51) Int. Cl.
*D06F 89/02* (2006.01)
*B62B 5/06* (2006.01)

(52) U.S. Cl.
CPC ....... *B62B 2202/65* (2013.01); *B62B 2301/04* (2013.01); *D06F 89/02* (2013.01)

(58) Field of Classification Search
CPC ... B62B 2202/65; B62B 2301/04; B62B 5/06; B62B 2202/04; D06F 89/02; D06F 89/023
USPC ...................................................... 280/47.35
See application file for complete search history.

(56) References Cited

U.S. PATENT DOCUMENTS

| | | |
|---|---|---|
| 6,152,462 A | 11/2000 | Barrett |
| 6,663,202 B2 * | 12/2003 | Spann ................. A61G 12/001 312/241 |
| 6,945,546 B2 | 9/2005 | Guirlinger |
| 7,725,986 B2 * | 6/2010 | Tsai ........................ B60B 3/048 16/46 |
| 8,864,149 B2 * | 10/2014 | Stryker ................ A61G 12/001 280/47.35 |
| 2005/0212233 A1 | 9/2005 | Hall |
| 2005/0280228 A1 * | 12/2005 | Fernandes ................ B25H 1/00 280/47.35 |
| 2006/0006621 A1 | 1/2006 | Santa Cruz et al. |
| 2013/0248475 A1 | 9/2013 | Erickson |

OTHER PUBLICATIONS

"Global™ Industrial 27" 2-Drawer Tool Cart W/ Sliding Top," GlobalIndustrial.com, Aug. 30, 2017.
40" Sliding Lid 6+2 Drawer Shop Cart, Snap-on.com, Aug. 30, 2017.
"Best Mechanic's Cart Under $250—Truckin Tough," Truckend.com, Aug. 30, 2017.

* cited by examiner

APPAREL CART

CROSS REFERENCE TO RELATED APPLICATION

This invention claims priority to U.S. provisional patent application Ser. No. 62/561,506, filed Sep. 21, 2017 and entitled "Apparel Cart", which is incorporated entirely herein by reference.

FIELD OF THE DISCLOSURE

The present disclosure relates generally to the treatment of apparel at retail establishments, and more specifically to an apparatus, system, and method for folding, repacking, and hanging apparel items for presentable display at a store.

BACKGROUND

Retail establishments that sell apparel such as clothing typically have internal processes for returning apparel items to a rack, shelf, or other original location after the apparel falls on the floor or is otherwise removed from its original location or packaging due to a customer removing the apparel to try it on, to feel it, and so on. Also, retail establishments desire to display apparel in a manner that portrays an image of the establishment providing high quality, clean, and organized apparel in order to attract and retain customers.

Folding, organizing, or repackaging an apparel item typically requires a store associate to temporarily leave a sales floor to perform such tasks. Also, a table suitable for performing such tasks, as well as necessary accessories, such as spare packaging, spot remover, coat hangers, and so on must be readily available. Unfortunately, typical folding tables and/or storage compartments for holding accessories are often too small, monolithic, cluttered, disorganized, and/or immobile. Typical garment racks, such as z-racks or the like, are readily available for hanging shirts, coats, or other apparel, but are too large for effectively transporting the rack to other locations of the store, and lack organized storage space for necessary accessories.

SUMMARY

In one aspect, an apparel cart comprises a base portion that includes a table; a slideable shelf and a pullout drawer, each constructed and arranged for positioning under the table and extendable from either a first side or second side of the table; a hanger rod assembly extending from a first end of the table, wherein at least one of the table, the slideable shelf, the pullout drawer, or the hanger rod assembly is constructed and arranged for a user to perform an operation on at least one apparel item; and a set of wheels coupled to a bottom region of the base portion for moving the apparel cart between a location where the operation is performed on the at least one apparel item to another location.

In some embodiments, the operation performed on the at least one apparel item includes at least one of storing, folding, hanging, transporting, repackaging, organizing, cleaning, or mending the at least one apparel item.

In some embodiments, the table is constructed and arranged for the organizing, cleaning, or mending operation of an item of the at least one apparel item, the hanger assembly is constructed and arranged for the hanging operation of an item of the at least one apparel item, the wheels are for the transporting of the at least one apparel item, the slideable shelf is constructed and arranged for the folding and organization of an item of the at least one apparel items, and the pullout drawer is constructed and arranged for storing accessories for performing the operation.

In some embodiments, the base portion further includes a metal frame; a first shelf fixedly coupled to the frame below the table; and a second shelf fixedly coupled to the frame below the first shelf, the first and second shelves constructed and arranged for temporarily storing the at least one apparel item.

In some embodiments, at least one of the first and second shelves includes first and second ends; first and second side panels that form a perimeter with the first and second ends about the table; a plurality of slots in the first and second side panels; and a plurality of dividers positioned in the slots between the first and second side panels.

In some embodiments, the apparel cart further comprises a set of wheels coupled to the frame for transporting the apparel cart to different store locations.

In some embodiments, the apparel cart further comprises a swivel caster wheel assembly including at least two of the wheels.

In some embodiments, the apparel cart further comprises a holder region extending along the base portion for holding at least one apparel folder.

In some embodiments, the apparel cart further comprises a handle extending from an opposite end of the base portion as the hanger rod assembly.

In some embodiments, the apparel cart further comprises at least one runner channel under the table for receiving and allowing the shelf and drawer to slide inside the runner channels.

In another aspect, an apparel cart, comprising: a base portion that includes a table; a slideable shelf and a pull-out drawer, each constructed and arranged for positioning under the table and extendable from either a first side or second side of the table; at least one shelf below the table, the at least one shelf including a plurality of dividers; and a holder region extending along the base portion for holding at least one apparel folder.

In some embodiments, the apparel cart further comprises a set of wheels coupled to a bottom region of the base portion for moving the apparel cart between a location where the operation is performed on the at least one apparel item to another location.

In some embodiments, the apparel cart further comprises a hanger rod assembly extending from a first end of the table, wherein at least one of the table, the slideable shelf, the pull-out drawer, or the hanger rod assembly is constructed and arranged for a user to perform an operation on at least one apparel item.

In some embodiments, the operation performed on the at least one apparel item includes at least one of storing, folding, hanging, transporting, repackaging, organizing, cleaning, or mending the at least one apparel item.

In another aspect, a method for treating an apparel item, comprises positioning at least one apparel item on an apparel cart; and performing an operation on the at least one apparel item, including at least one of storing, folding, hanging, transporting, repackaging, organizing, cleaning, or mending the apparel item, including: positioning an apparel item of the at least one apparel item on a table of the apparel cart for performing the organizing, cleaning, or mending operation; positioning an apparel item of the at least one apparel item on a hanger assembly of the apparel cart for performing the hanging operation; moving the apparel cart to different locations for performing the transporting operation; removing an apparel folder from a holder region of the apparel cart for performing the folding or repackaging operation; extending a slideable shelf from under the table for performing the organizing operation; and extending a pullout drawer from under the table for storing accessories for performing the operation.

BRIEF DESCRIPTION OF THE DRAWINGS

Exemplary embodiments will now be described, by way of example only, with reference to the following drawings, in which.

DESCRIPTION OF PREFERRED EMBODIMENTS

Figure 1:
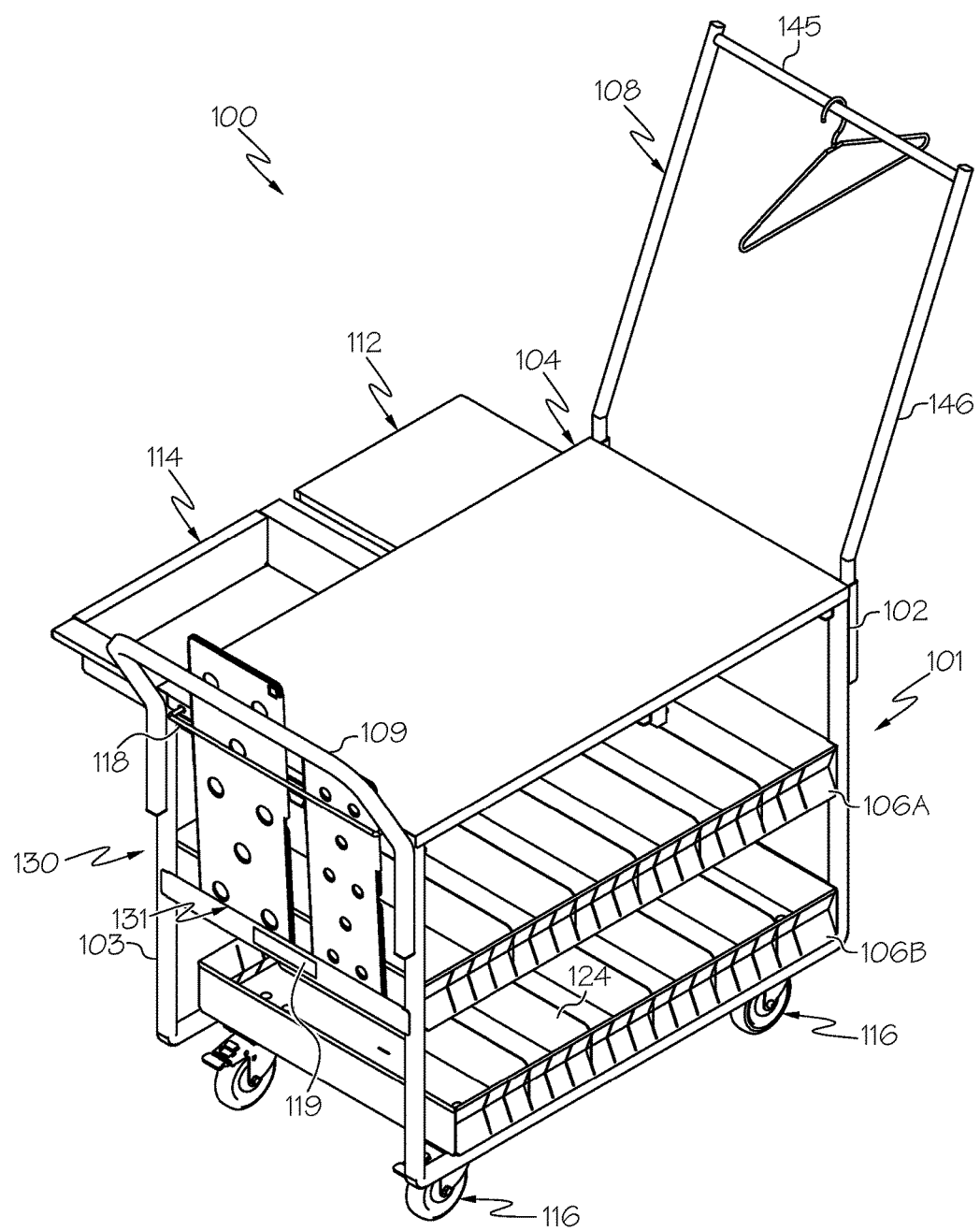
FIG. 1 is a perspective view of an apparel cart, in accordance with some embodiments.
Figure 2:
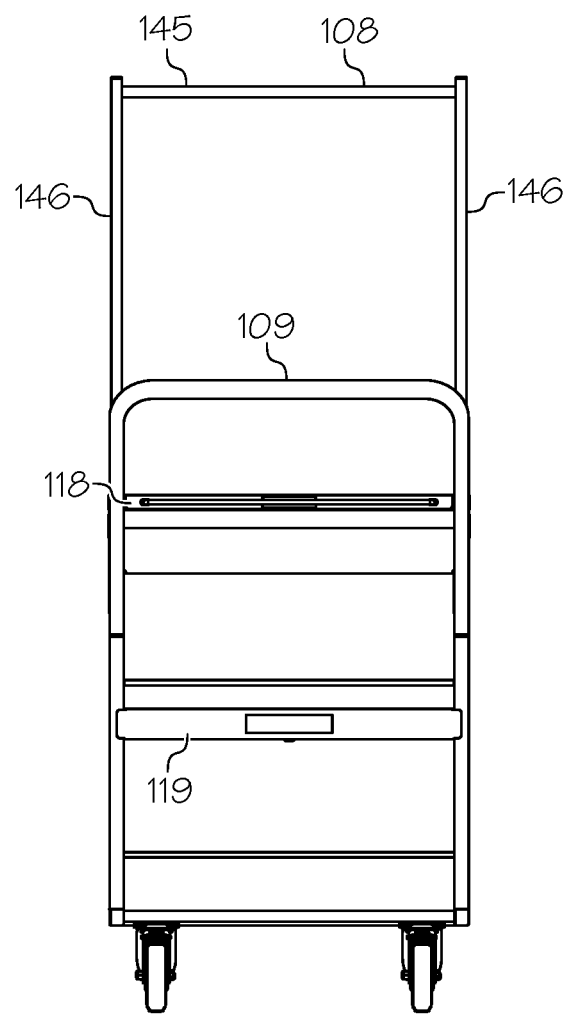
FIG. 2 is a front view of the apparel cart of FIG. 1.

Referring to the accompanying drawings, there is illustrated an apparel cart 100 according to an embodiment of the present disclosure. The apparel cart 100 is constructed and arranged to provide multiple functions, including but not limited to temporarily storing, folding, hanging, transporting, repackaging, organizing, cleaning, and/or mending apparel items.

As shown in FIGS. 1-5, the apparel cart 100 comprises a base portion 101 including a frame 102, a table 104 and two shelves 106A, 106B (generally, 106) fixedly coupled to the frame 102 below the table 104. Although two shelves 106A, 106B are shown, the apparel cart 100 is not limited to two shelves, and may in other embodiments include one shelf or more than two shelves.

In some embodiments, as shown by way of example at FIGS. 1-5, the frame 102 may include a square or rectangular configuration including four corner posts 103, a bottom portion 105, and top portion. Some or all elements of the frame 102, for example, the corner posts 103, may be formed of steel tubes or other elongated elements, for example, 0.75 inch by 1 inch RCT steel, 1 inch square 16 gauge, or other heavy duty rigid metal or composite material that supports the weight and coupling of the table 104, shelves 106, hanger rod assembly 108, and handle 109 coupled to the frame 102 as well as any materials used for storing, hanging, transporting, repackaging, organizing, cleaning, and/or mending apparel items treated by the apparel cart 100. For example, the hanger rod assembly 108 may be used for hanging apparel items positioned in hangers that may be fallen on the floor and require pickup and return to its intended location in the store. In some embodiments, the table 104 is constructed and arranged for the organizing, cleaning, or mending operation of an item of the at least one apparel item, and the hanger assembly 108 is constructed and arranged for the hanging operation of an item of the at least one apparel item.

Figure 8:
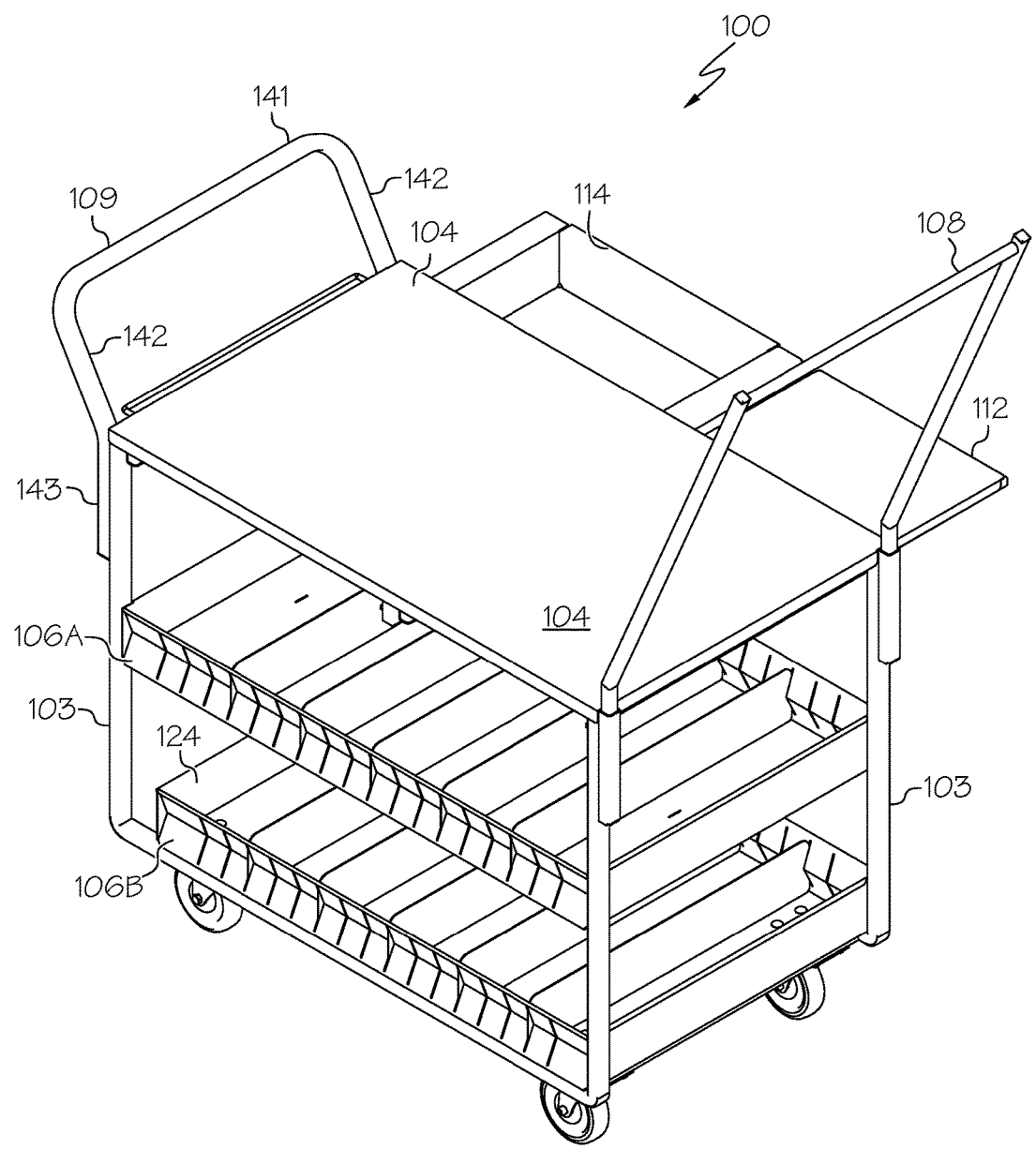
FIG. 8 is a perspective view of the apparel cart of FIG. 1 where a slideable shelf and pullout drawer extend from an opposite side of a top table than shown in FIG. 1, in accordance with some embodiments.

In addition to the base portion 101, the apparel cart 100 includes a slideable shelf 112 and pull-out drawer 114, each constructed and arranged for translation along a linear path parallel to that table 104 for slideable positioning under the table 104 and movably extending to and from either side of the table 104. For example, a left-handed user may prefer to use the shelf 112 and/or drawer 114 extending from a left side of the table 104, for example, shown in FIG. 1. However, a right-handed user may prefer to use the shelf 112 and/or drawer 114 extending from a right side of the table 104, for example, shown in FIG. 8. Thus, either the shelf 112 or drawer 114 or both can movably extend from either side of the table 104. In some embodiments, one of the shelf 112 and drawer 114 is constructed and arranged to movably extend from underneath one side of the table 104, and the other of the shelf 112 and drawer 114 is constructed and arranged to movably extend from underneath the opposite side of the table 104. To achieve this, the drawer 114 has dimensions for holding apparel-specific supplies such as a garvey gun for certain apparel items, packaging tape, tickets and security tags for other items, and so on, for example, a depth of about 4 inches, and interior length and width of 18 inches by 10 inches. The drawer 114 may also hold notebooks, files, personal computers, and so on that contain apparel-related information such as repackaging order numbers for apparel items, for easy and efficient retrieval. The drawer 114 and shelf 112 may have different dimensions. For example, the drawer 114 may have a length of about 22 inches and a width of about 11 inches, and the shelf 112 has a length of about 16 inches and a width of about 11 inches, but not limited thereto so that other dimensions may equally apply. In some embodiments, the slideable shelf 112 is constructed and arranged for the folding and organization of an item of the at least one apparel items, and the pull-out drawer 114 is constructed and arranged for storing accessories for performing an operation.

Figure 3A:
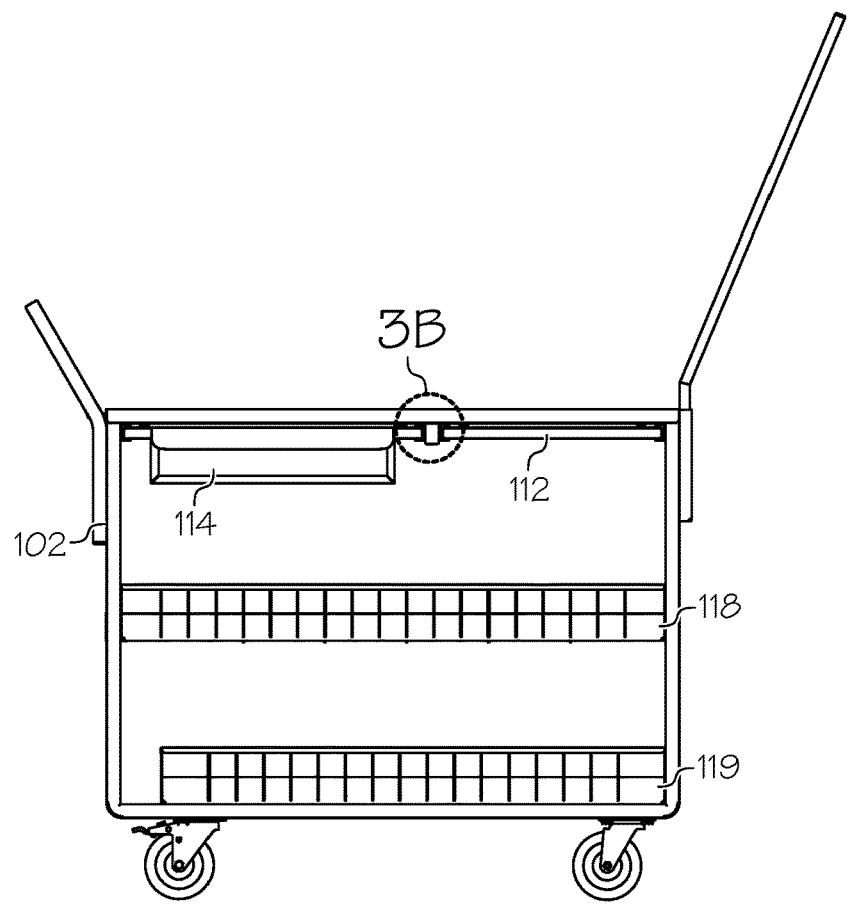
FIG. 3A is a side view of the apparel cart of FIGS. 1 and 2 and FIG. 3B is a blowup view of a region of the apparel cart of FIG. 3A (FIGS. 3A and 3B are generally referred to as FIG. 3).
Figure 3B:
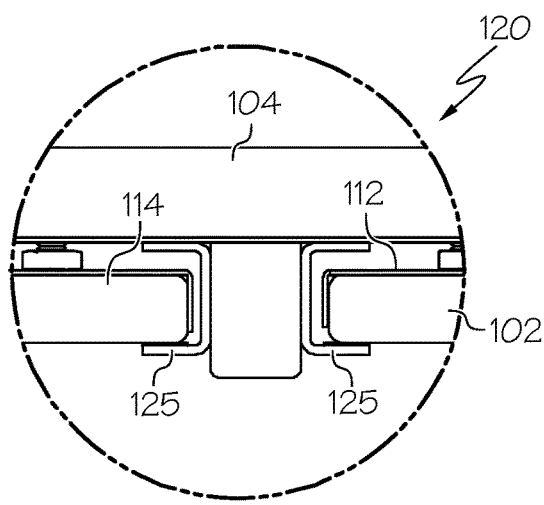

Referring to FIG. 3, the frame 102 may include a table frame assembly 120 on which the table 104 is positioned and attached, for example, by bonding, adhesives, screws, or other coupling mechanism known for coupling metal components together. The table frame assembly 120 may be formed of steel tubes or the like. For example, two steel tubes 121, 122 may extend along a same longitudinal axis as a length of the table 104 coupled to the tubes 121,122. The steel tubes 121,122 may be separated from each other by a predetermined distance, a space in which a partitioning element 128 such as a rod, tube, or other elongated object extends perpendicular to the steel tubes 121, 122. A runner channel 125 may couple to and extend from the table 104 and a side of the partitioning element 128. As shown in FIG. 3, two runner channels 125 may be coupled to the partitioning element 128: one on each side of the portioning element 124. The runner channels 125 may be C-shaped or the like for receiving and allowing translation of a lip of the drawer 114 and/or a side of the shelf 112.

The shelf 112 and drawer 114 may be formed of similar materials and/or similar dimensions. In some embodiments, the shelf 112 and drawer 114 are each formed of steel, for example, 18 gauge steel. Other elements of the cart 100 may be formed of a same type of material, for example, 18 gauge steel, such as the shelves 106A, 106B affixed to the frame 102 below the table 104. In particular, tubular elements used for assembling the apparel cart 100 may be formed of 18 gauge steel, but not limited thereto. In some embodiments, tubular elements used for assembling the apparel cart 100 may be formed of a 0.75 inch×1 inch RCT steel tube material. In some embodiments, the runner channels 125 are formed of steel, for example, 12 gauge steel. In some embodiments, the runner channels 125 may include a high-bond, low-friction tape, for example, a 0.020 inch×0.5 inch tape, or other friction-reducing element for allowing the shelf 112 and drawer 114 to slide inside the runner channels 125 extending under the table 104 along a width of the table 104. Accordingly, the shelf 112 and drawer 114 can extend from under the table 104 on either side of the table 104.

Figure 6:
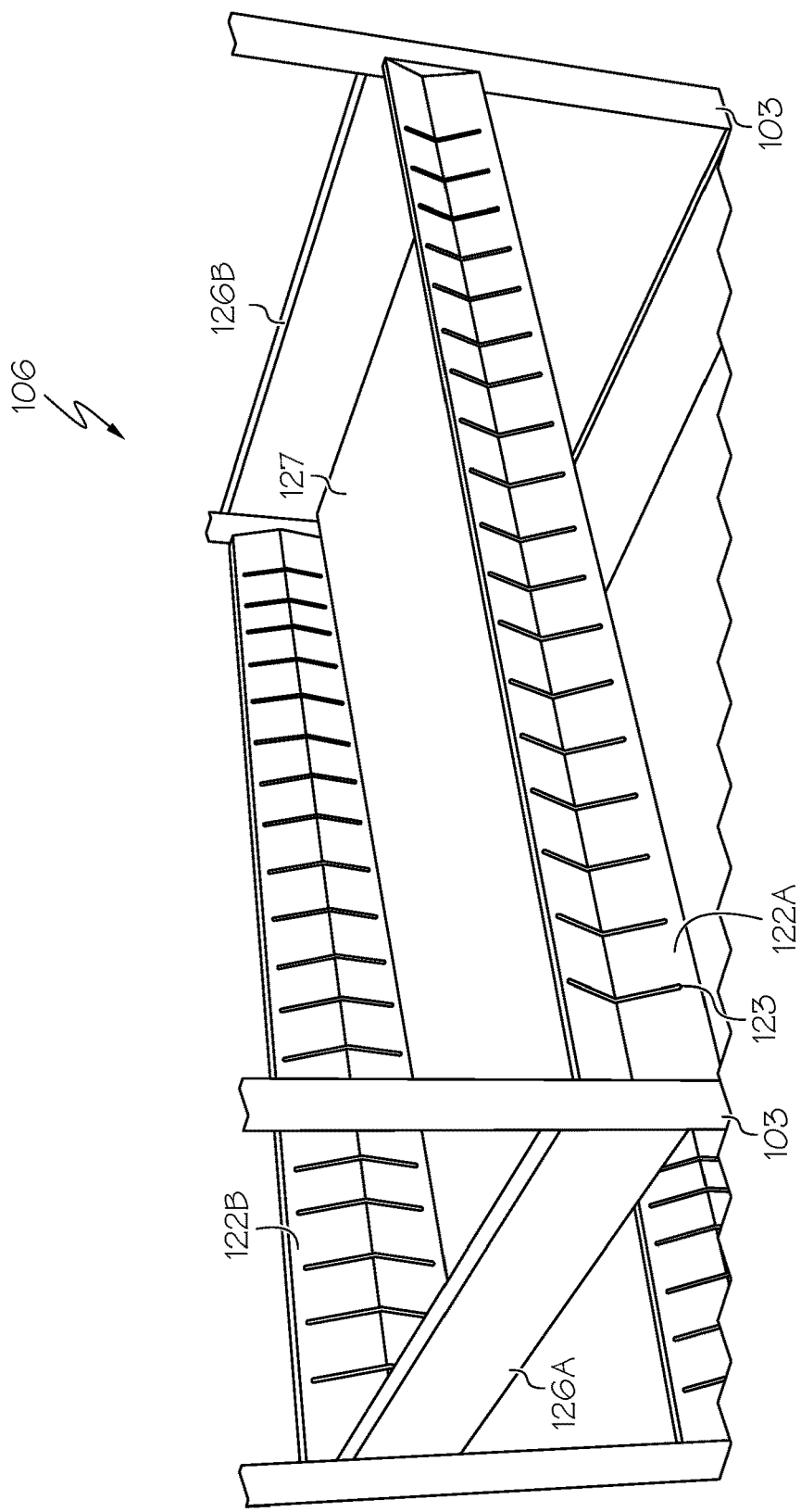
FIG. 6 is a closeup perspective view of a shelf of an apparel cart, in accordance with some embodiments.
Figure 7:
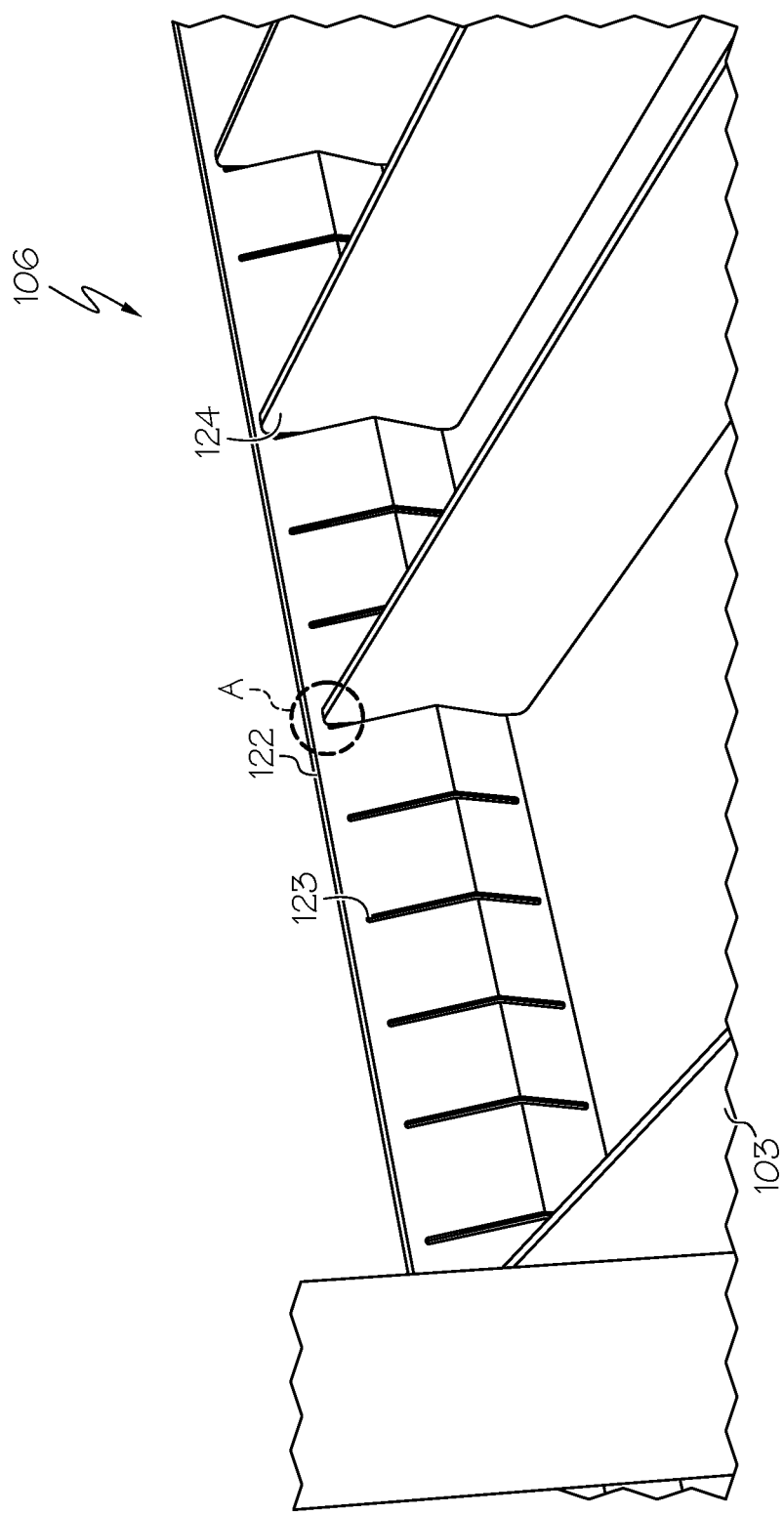
FIG. 7 is a closeup perspective view of the shelf of FIG. 6 including dividers, in accordance with some embodiments.

As shown in FIGS. 6 and 7, a shelf 106 may include two ends 126A, 126B and two side panels 122A, 122B that collectively form a perimeter or edge about a shelf table 127 or other flat surface of an interior region of the shelf 106. Each side panel 122A, 122B (generally, 122) may have a v-shaped cross-section. More specifically, the side panels 122 are coupled to or otherwise extend along a length of the table 127 between two corner posts 103 of the frame 102. Here, a center region of the side panel 122 is closer to the interior of the table 127 than the outermost edges of the side panel 122, thereby forming a V-shaped cross section. A plurality of slots, vents, or the like 123 may extend in a perpendicular direction relative to the direction of extension of the side panel 122. A slot 123 on one side panel 122A may be aligned with a counterpart slot 123 in the other side panel 122B. Thus, a divider 124 or related elongated element can extend along a width of the shelf table 127 between side panel 122A and side panel 122B, and the ends of the divider 124 can be inserted in the slots 123 to hold the divider 124 in place along the shelf table 127. An outermost edge of the divider 124 when inserted in a side panel slot 123 may directly abut the surface of the v-shaped side panel 122, for example, at region A shown in FIG. 7, for a secure locking of the divider 124 in the side panel 122. One or more dividers 124 may be removed from the shelf 106 to provide more space on the table 127 between the remaining dividers 124. The dividers 124 removed here may allow for customized shelf space, for example, modularize repackaging materials by department, category, or other organization.

Figure 4:
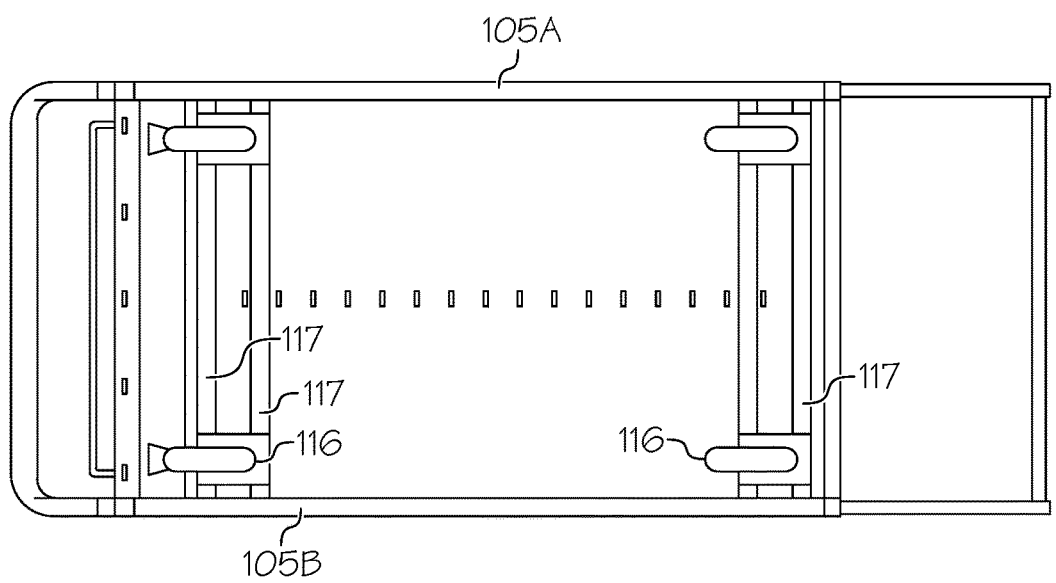
FIG. 4 is a bottom view of the apparel cart of FIGS. 1-3.
Figure 5:
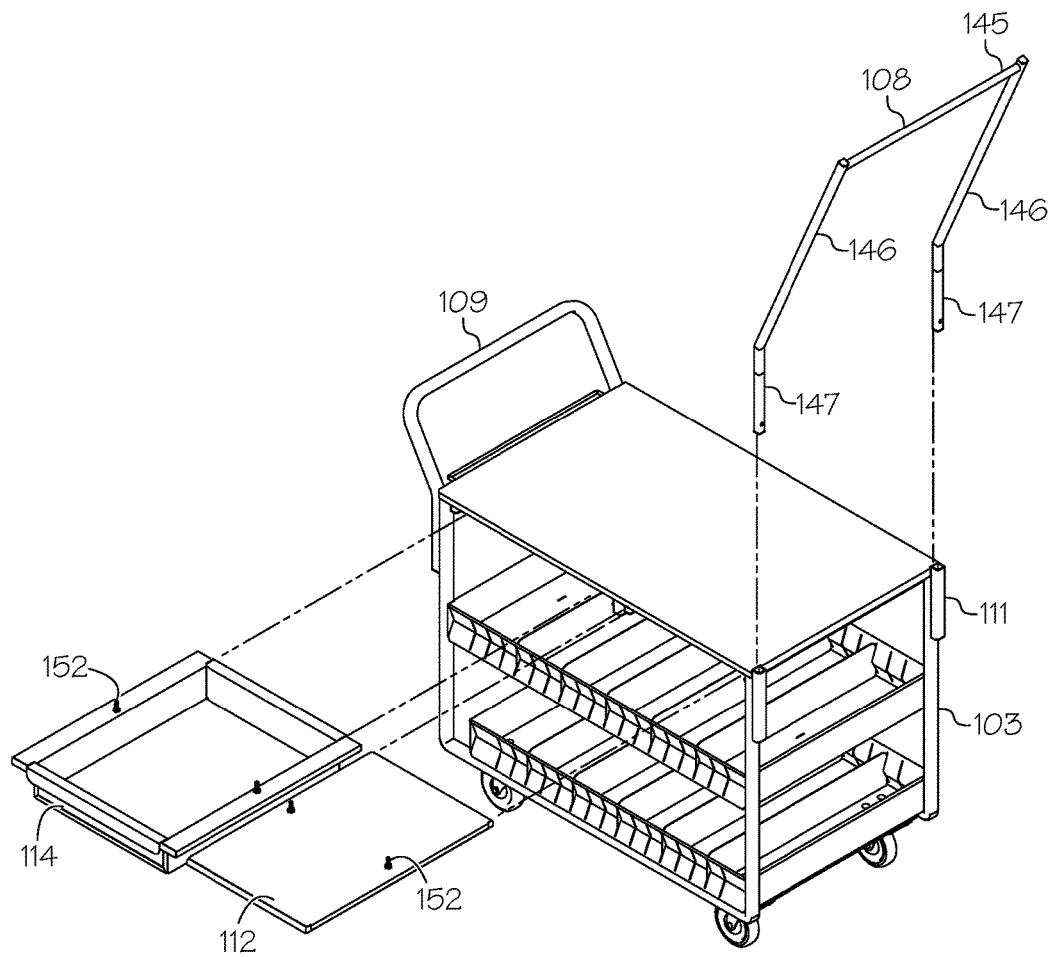
FIG. 5 is a partially exploded view of an apparel cart of FIGS. 1-4.

In some embodiments, the bottom portion 105 of the frame 102 may include steel frame elements similar to the frame side posts 103. In some embodiments, a bottom element 105 and a side post 103 are formed from a same metal stock, i.e., a single piece formed, e.g., bent, at a 90 degree angle to form the side post 103 and bottom element 105. As shown in FIG. 4, at least one crossbar 117 or rail, track, or the like may extend between two sides 105A, 105B of the bottom portion 105 of the frame 102. The crossbars 117 may be formed on a steel tube or the like, for example, a 0.75 in ×1 in RCT steel tube.

The apparel cart 100 may further include a set of wheels 116 extending from one or more crossbars 117 or directly coupled to the bottom elements 105 of the frame 102 so that a user can move, i.e., push or pull, the cart 100 between locations of interest in the store. In some embodiments, at least two wheels 116 are swivel wheels, for example, part of a swivel caster wheel assembly such as a 5"×1.25" swivel polyurethane caster wheel assembly. The swivel wheels 116 as well as the dimensions of the cart, for example, 25 inches in width, permit the cart 100 to be positioned in small spaces in the store. In some embodiments, at least one of the four wheels 116 has an integrated directional swivel wheel lock or brake or the like to prevent rotation of these wheels to prevent the cart 100 from moving during use of the table for folding or other use. In some embodiments, the swivel wheels 116, for example, rear wheels, each have a wheel lock to prevent swiveling and to allow the cart 100 to travel in a straight line and to prevent inadvertent wheel motion. In other embodiments, all four wheels 116 have a wheel lock or brake.

In some embodiments, the apparel cart 100 includes a holder region 130 comprising a rod 118, a lip or holder channel 119, and an opening between the rod 118 and holder channel 119 and the frame 102 and one end 126A of the shelves 106. The holder region 130, in particular, the rod 118 and holder channel 119, extends vertically between two posts 103 of the frame 102. In some embodiments, an edge 126A of a shelf 106 may be used instead of a lip 134 for receiving and positioning a bottom edge of a removable object positioned in the holder region 130, for example, one or more apparel folding boards 131 having hinges and movable flat surfaces or related tools for folding apparel items. During operation, items may be folded on the table 104 using a folding board 131. The folded items can be transferred to the expanded shelf 112, which can temporarily hold a stack of folded apparel items, which can subsequently be transferred from the cart shelf 112 to a store location such as a store shelf.

Figure 9:
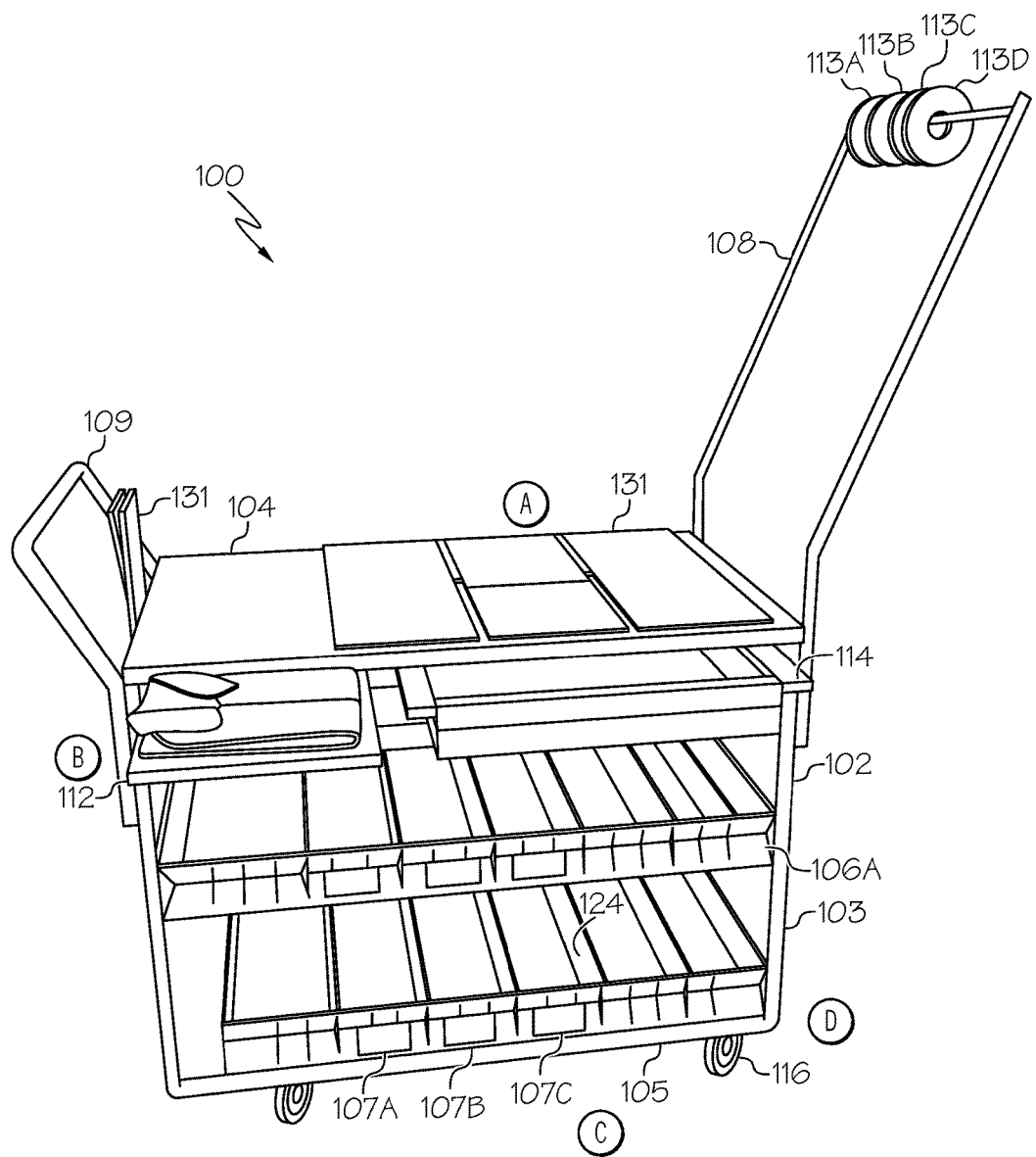
FIG. 9 is a perspective view of an apparel cart during an operation, in accordance with some embodiments.

In this example, the apparel folding boards 131 may be positioned in the holder region 130 when not in use, and as shown in FIG. 9, may be positioned on the table 104 when in use. The folding boards 131 may of different shapes and sizes, depending on the type of apparel to which the folding boards 131 are applied, for example one size for folding large shirts, towels, and related laundry, and another size for folding small shirts, towels, and related laundry. Other folding accessories may equally apply, and are not limited thereto. The holder region 130 can receive other accessories for use in connection with the apparel cart 100, for example, cleaning supplies such as mops, brooms, or other elongated objects.

In some embodiments, the apparel cart 100 further comprises a hanger rod assembly 108 and handle 109 on opposite sides of the apparel cart 100. The handle 109 may be formed of steel tubing or the like. The handle 109 may include a top bar 141 and two side bars 142 formed from a same metal stock, i.e., a single piece bent at 90 degree angles to form the top 141 and side 142 portions. Each side bar 142 may be further bent at an angle so that a bottom portion 143 of the side bar 142 is parallel to a frame post 103, and for coupling, e.g., bonded, screws, and so on, to the frame post 103, while the top portion of the side bar 142 is angled, i.e., facing away from the frame 102 as shown.

The hanger rod assembly 108 may have a similar configuration as the handle 109. For example, the hanger rod assembly 108 may include a top bar 145 and two side bars 146, which may be formed from a same metal stock, i.e., a single piece bent at 90 degree angles to form the top 141 and side 142 portions, or formed of three separate elongated elements than coupled together. For example, the top bar 145 may have a different configuration, for example, formed of a 0.75 inch, 11 gauge steel tube, while the side bars 146 are formed of a 0.75 inch, 16 gauge steel tube. Although a steel tube material may be used, the top bar 145 and/or side bars 146, as with any other elongated elements of the apparel cart 100, may be rectangular or square shape, i.e., four sides and four corners, or other polygon shape with more than or less than four sides. Each side bar 146 may be further bent at an angle so that a bottom portion 147 of the side bar 146 is parallel to a frame post 103. In some embodiments, the hanger rod assembly 108 is removably attached to the frame 102. For example, the bottom portion 147 of the side bar 146 is inserted into a tubular element 111, which in turn is bonded, welded, or otherwise coupled to the frame 102. Thus, the angle between the bottom portions 147 and top portions of the side bars 146 permits the hanger rod assembly 108 to extend in a direction away from the frame 102. However, the hanger rod assembly 108 can be inserted in the tubular elements 111 so that the top bar 145 is positioned over the table 104, for example, when storing or shipping the apparel cart 100 for reducing the overall length of the apparel cart 100.

Figure 10A:
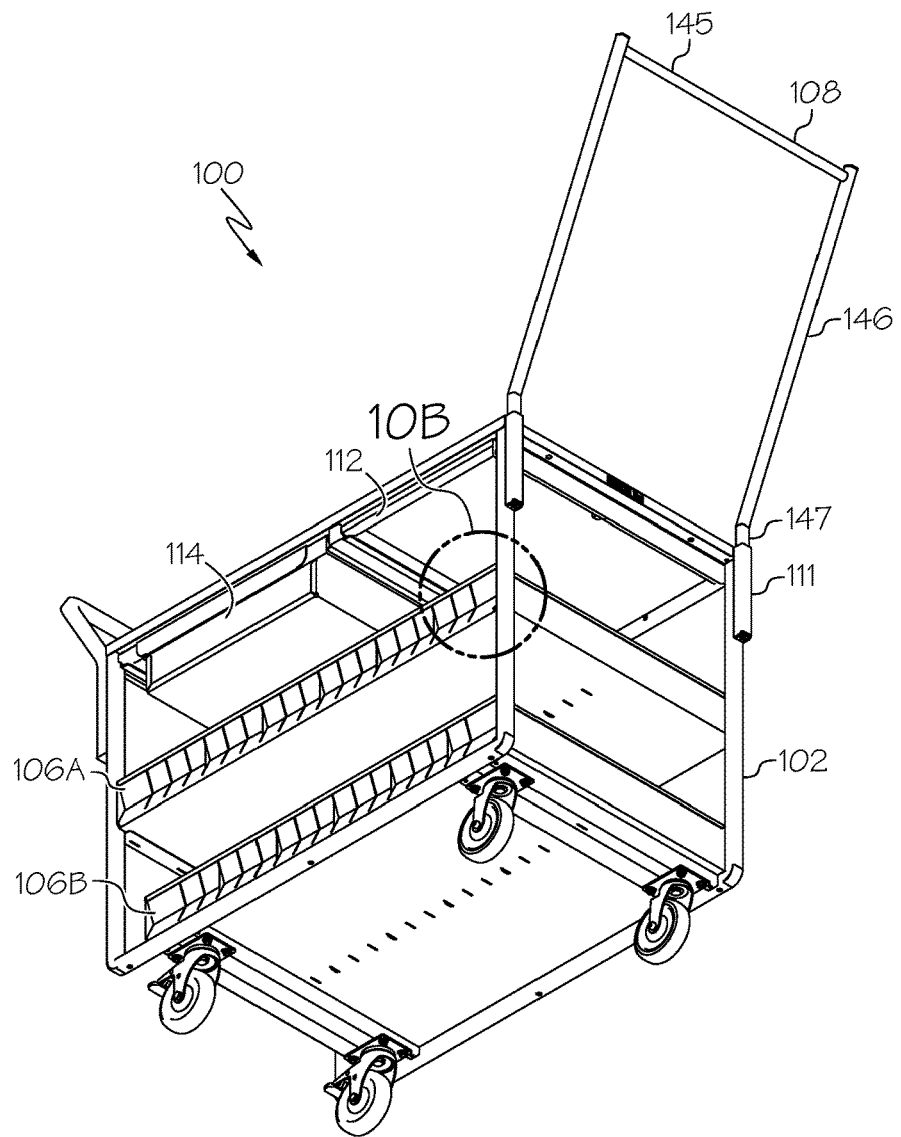
FIG. 10A is a perspective view of an apparel cart including a coupling mechanism and FIG. 10B is a blowup view of a coupling mechanism of the apparel cart of FIG. 10A (FIGS. 10A and 10B are generally referred to as FIG. 10), in accordance with some embodiments.
Figure 10B:
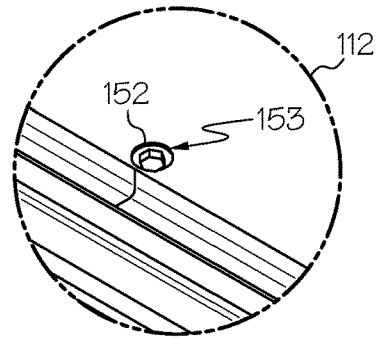

Referring to FIG. 10, a stopping bolt 152 or related element can be inserted in a hole 153 and used to prevent the drawer 114 (as shown) and/or shelf 112 from sliding out from at least one side of the frame 102 of the cart 100, and allows that drawer 114 and/or shelf 112 to slide partially from under the table 104, for example, so that a maximum of 50% of the drawer 114 and/or shelf 112 extends from an edge of the frame.

FIG. 9 is a perspective view of an apparel cart 100 during an operation, in accordance with some embodiments. The apparel cart 100 is constructed and arranged to provide multiple functions, including the use of table 104 for performing an operation (A) including the layout of folding boards 131 that are stored at the holder region 130 of the cart 100 when not in use. The apparel cart 100 includes the slideable shelf 112 that may be retracted under the table 104 when not in use, or extended for performing an operation (B) such as holding temporarily a stack of folded apparel items, which can subsequently be transferred from the cart shelf 112 to a store location such as a store shelf.

The apparel cart 100 can include a set of identifiers 107A-F, such as color-coded stickers, each positioned at a region of a shelf 106 separated by dividers 124. Each color-coded region may include items relevant to a particular type of apparel. A counterpart set of color-coded identifiers 113A-D (generally, 113), such as hangers or the like may extend from the hanger rod assembly 108. Each colored sticker 107 may have a matching colored hanger identifier 113 so that during an operation (C) a user can easily identify accessories for a particular piece of apparel. This feature may assist a user with organizing accessories, supplies, or the like according to location, department, or other organized manner.

The apparel cart 100 can include a set of wheels 116 to allow a transporting operation (D) to take place, where apparel items on the cart 100 may be transported to other store locations.

In some embodiments, the apparel cart 100 includes a power source, i.e., a battery, power supply, transformer, electrical cord to an outlet, alternative energy source such as solar panels, self-powered system, and so on, which may be used to provide power to electrical devices, such as portable scanner, handheld computer, standard ironing appliance and so on. Such electrical devices may be stored in the drawer 114 or a shelf 106 and be used to perform one or more operations using the apparel cart 100. One or more electrical outlets may be located about the cart 100 for providing power.

The embodiments and examples set forth herein are presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. An apparel cart, comprising:
   a base portion that includes a table;
   a slideable shelf and a pull-out drawer, each constructed and arranged for being directly adjacent each other under the table and extendable from either a first side or second side of the table;
   a partitioning element extending vertically from a bottom surface of the table;
   a first runner channel extending horizontally from a first side of the partitioning element, wherein a side of the slideable shelf is positioned between the first runner channel and the bottom surface of the table for permitting a movement of the slideable shelf along the first runner channel;
   a second runner channel extending horizontally from a second side of the partitioning element opposite the first side, wherein a side of the pull-out drawer is positioned between the second runner channel and the bottom surface of the table for permitting a movement of the pull-out drawer along the second runner channel;
   a hanger rod assembly extending from a first end of the table, wherein at least one of the table, the slideable shelf, the pull-out drawer, or the hanger rod assembly is constructed and arranged for a user to perform an operation on at least one apparel item;
   a handle extending from an opposite end of the base portion as the hanger rod assembly, the hanger rod assembly having a lower vertical portion coupled to the base portion and an upper portion extending tangentally from the lower vertical portion in a direction away from the handle;
   a holder region extending between the handle and the base portion for holding at least one apparel folder or other elongated objects, the holder region comprising a holder channel below the handle and between two vertical posts of the base for receiving the at least one apparel folder or other elongated objects; and
   a set of wheels coupled to a bottom region of the base portion for moving the apparel cart between a location where the operation is performed on the at least one apparel item to another location.

2. The apparel cart of claim 1, wherein the operation performed on the at least one apparel item includes at least one of storing, folding, hanging, transporting, repackaging, organizing, cleaning, or mending the at least one apparel item.

3. The apparel cart of claim 2, wherein the table is constructed and arranged for the organizing, cleaning, or mending operation of an item of the at least one apparel item, the hanger rod assembly is constructed and arranged for the hanging operation of an item of the at least one apparel item, the wheels are for the transporting of the at least one apparel item, the slideable shelf is constructed and arranged for the folding and organization of an item of the at least one apparel items, and the pull-out drawer is constructed and arranged for storing accessories for performing the operation.

4. The apparel cart of claim 1, wherein the base portion further includes:
a metal frame;
a first shelf fixedly coupled to the frame below the table; and
a second shelf fixedly coupled to the frame below the first shelf, the first and second shelves constructed and arranged for temporarily storing the at least one apparel item.

5. The apparel cart of claim 4, wherein at least one of the first and second shelves includes:
first and second ends;
first and second side panels that form a perimeter with the first and second ends about the table;
a plurality of slots in the first and second side panels; and
a plurality of dividers positioned in the slots between the first and second side panels.

6. The apparel cart of claim 4, further comprising a set of wheels coupled to the frame for transporting the apparel cart to different store locations.

7. The apparel cart of claim 6, further comprising a swivel caster wheel assembly including at least two of the wheels.

8. An apparel cart, comprising:
a base portion that includes a table;
a slideable shelf and a pull-out drawer, each constructed and arranged for positioning under the table and extendable from either a first side or second side of the table;
a partitioning element extending vertically from a bottom surface of the table;
a first runner channel extending horizontally from a first side of the partitioning element, wherein a side of the slideable shelf is positioned between the first runner channel and the bottom surface of the table for permitting a movement of the slideable shelf along the first runner channel;
a second runner channel extending horizontally from a second side of the partitioning element opposite the first side, wherein a side of the pull-out drawer is positioned between the second runner channel and the bottom surface of the table for permitting a movement of the pull-out drawer along the second runner channel;
at least one shelf below the table, the at least one shelf including a plurality of dividers;
a handle extending from an opposite end of the base portion as the hanger rod assembly, the hanger rod assembly having a lower vertical portion coupled to the base portion and an upper portion extending tangentially from the lower vertical portion in a direction away from the handle; and
a holder region extending between the handle and the base portion for holding at least one apparel folder, the holder region comprising a holder channel below the handle and between two vertical posts of the base for receiving the at least one apparel folder or other elongated objects.

9. The apparel cart of claim 8, further comprising a set of wheels coupled to a bottom region of the base portion for moving the apparel cart between a location where the operation is performed on the at least one apparel item to another location.

10. The apparel cart of claim 8, further comprising a hanger rod assembly extending from a first end of the table, wherein at least one of the table, the slideable shelf, the pull-out drawer, or the hanger rod assembly is constructed and arranged for a user to perform an operation on at least one apparel item.

11. The apparel cart of claim 8, wherein the operation performed on the at least one apparel item includes at least one of storing, folding, hanging, transporting, repackaging, organizing, cleaning, or mending the at least one apparel item.

* * * * *